United States Patent [19]
Male

[11] Patent Number: 5,982,130
[45] Date of Patent: Nov. 9, 1999

[54] CALIBRATION TECHNIQUE TO REMOVE SERIES RESISTANCE ERRORS IN THE SENSED BACK EMF OF A MOTOR

[75] Inventor: Barry Male, West Granby, Conn.

[73] Assignee: Unitrolde Corporation, Merrimack, N.H.

[21] Appl. No.: 09/133,700

[22] Filed: Aug. 13, 1998

[51] Int. Cl.$^6$ .................................................. H02P 7/00
[52] U.S. Cl. ......................................... 318/615; 318/254
[58] Field of Search .................................... 318/615, 254, 318/439, 138, 721, 722, 602, 603, 632

[56] References Cited

U.S. PATENT DOCUMENTS

| | | | |
|---|---|---|---|
| 3,568,027 | 3/1971 | Bacon | 318/331 |
| 4,078,194 | 3/1978 | Johnson, Jr. | 318/331 |
| 4,237,501 | 12/1980 | Barmache et al. | 360/75 |
| 4,350,940 | 9/1982 | Dupont et al. | 318/603 |
| 4,489,259 | 12/1984 | White et al. | 318/696 |
| 4,513,231 | 4/1985 | Kuno et al. | 318/341 |
| 4,536,809 | 8/1985 | Sidman | 360/77 |
| 4,724,369 | 2/1988 | Hashimoto | 318/561 |
| 4,749,927 | 6/1988 | Rodal et al. | 318/599 |
| 4,812,724 | 3/1989 | Langer et al. | 318/599 |
| 4,949,201 | 8/1990 | Abed | 360/78.07 |
| 4,965,848 | 10/1990 | Vasconi et al. | 388/815 |
| 5,005,207 | 4/1991 | Grave et al. | 388/816 |
| 5,119,250 | 6/1992 | Green et al. | 360/78.06 |
| 5,168,398 | 12/1992 | Kanda et al. | 360/78.04 |
| 5,341,453 | 8/1994 | Hill | 388/815 |
| 5,384,527 | 1/1995 | Rozman et al. | 322/10 |
| 5,461,293 | 10/1995 | Rozman et al. | 318/603 |
| 5,473,725 | 12/1995 | Chen et al. | 318/254 |
| 5,543,697 | 8/1996 | Carobolante et al. | 318/594 |
| 5,586,306 | 12/1996 | Romano et al. | 395/500 |
| 5,631,999 | 5/1997 | Dinsmore | 388/805 |
| 5,654,840 | 8/1997 | Patton et al. | 360/75 |
| 5,659,231 | 8/1997 | Svarovsky et al. | 318/368 |
| 5,672,944 | 9/1997 | Gokhale et al. | 318/254 |
| 5,699,207 | 12/1997 | Supino et al. | 360/78.09 |
| 5,920,162 | 7/1999 | Hanson et al. | 318/254 |

*Primary Examiner*—Jonathan Salata
*Attorney, Agent, or Firm*—Weingarten, Schurgin, Gagnebin & Hayes LLP

[57] ABSTRACT

A motor controller controls a motor's rotational speed using sensed back electromagnetic force (back EMF) of the motor. The sensed back EMF is presumed to contain an error component caused by series resistance in the motor coil. A velocity sense signal is continually generated representing the sum of the measured back EMF and an error-cancelling quantity equal to the current in the coil scaled according to a gain-control signal stored in the controller. During the first part of a calibration operation, the coil current is set to zero until a time $T_1$ at which the coil current is substantially zero and the motor velocity is substantially constant. The value of the velocity sense signal is stored at the time $T_1$, this value representing the zero-current back EMF of the coil. A current pulse of predetermined magnitude and duration is then provided to the coil such that at a predetermined equal-speed time during the pulse the coil current is non-zero and the motor speed is substantially equal to the motor speed at time $T_1$. At the equal-speed time, the gain-control signal is set to a calibrated value which causes the velocity sense signal to be equal to the zero-current back EMF value, so that the error-cancelling component is sufficient to remove the series resistance error. The calibrated gain-control signal is used during subsequent normal operation of the motor.

9 Claims, 3 Drawing Sheets

CALIBRATION TECHNIQUE TO REMOVE SERIES RESISTANCE ERRORS IN THE SENSED BACK EMF OF A MOTOR

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of motor controllers.

Motor controllers are employed to control the rotational speed of a motor. One type of controller relies upon a measurement of the back electromagnetic force (back EMF) appearing across a motor coil to obtain an indication of motor speed. In theory, the back EMF value is proportional to the motor's speed. The controller compares the back EMF measurement to a velocity command signal in order to sense deviation of the motor's actual speed from the desired speed, and in response adjusts the drive applied to the motor to correct for the speed deviation.

In reality, the back EMF measured across a motor coil is not perfectly proportional to the motor's rotational speed. One factor responsible for the imperfection is the non-zero series resistance of the motor coil. While the ideal motor coil has zero resistance, a real coil can have several ohms of resistance. This is true, for example, in voice-coil motors commonly used as actuators for read/write heads in computer disk drives. When a non-zero current is flowing in the coil, a non-zero voltage component equal to the product of the current and the resistance appears in the measured back EMF. The measured back EMF, then, can be viewed as the sum of an this error component and an ideal back EMF to which the motor rotational speed is proportional.

In some motor controllers, the presence of this error in the back EMF measurement is ignored. In these controllers the error is safely ignored because the resulting error in motor speed is within specified speed deviation limits for the application in which the motor is used.

In some applications, however, it is desirable to more accurately control motor speed. In such applications the back EMF measurement error is unacceptable. One example is the case mentioned of a voice-coil motor for a head actuator. It is important to accurately control the speed of a read/write head as it is being loaded onto a disk, so that the head does not strike the disk hard and cause damage. Similarly, it is important to avoid striking the head against a head stop when retracting the head from the disk. In applications like a head actuator in which greater motor speed accuracy is required, it is necessary to minimize the error component from the back EMF measurement.

BRIEF SUMMARY OF THE INVENTION

In accordance with the present invention, a motor controller is disclosed in which a calibration operation is carried out that substantially reduces the error component in the measured back EMF of a motor coil caused by series resistance in the coil, and thus enables high-accuracy speed control during normal operation of the motor.

In the disclosed motor controller, a velocity sense signal is continually generated that represents the ideal back EMF of the motor coil as the sum of the measured back EMF and an error-cancelling quantity. The error-cancelling quantity is equal to the current in the coil scaled according to a gain-control signal stored in the controller. The gain-control signal is calibrated so that the error-cancelling quantity is substantially equal to the error voltage arising from current flowing through the series resistance of the coil.

During the calibration operation, the current provided to the coil is initially set to zero, and a settling time is allowed to pass in which the coil current settles to zero. At a time $T_1$ at which the coil current is substantially zero and the motor velocity is substantially constant, the value of the velocity sense signal is stored, this value representing the zero-current back EMF of the coil. A current pulse of predetermined magnitude and duration is then provided to the coil such that at a predetermined time during the pulse the coil current is non-zero and the motor speed is substantially equal to the motor speed at time $T_1$. At this predetermined time during the pulse, the gain-control signal is set to a calibrated value which causes the velocity sense signal to be equal to the zero-current back EMF value. Because a non-zero current is flowing in the coil at this time, the measured back EMF of the coil contains a non-zero series resistance error component. However, the gain-control signal has been set to a calibrated value that removes the error component from the velocity sense signal. The calibrated gain-control signal is used during subsequent normal operation of the motor controller to achieve high-accuracy motor speed control.

Other aspects, features, and advantages of the present invention are disclosed in the detailed description which follows.

DETAILED DESCRIPTION OF THE INVENTION

Figure 1:
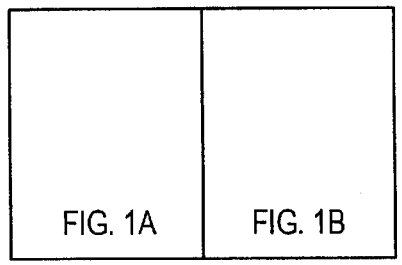
FIG. 1, which consists of FIGS. 1A and 1B, is a schematic diagram of a motor speed controller in accordance with the present invention.

In FIG. 1, the coil of a voice-coil motor (VCM) 10 (FIG. 1B) is modelled as an ideal voltage source $V_{EMF}$ in series with an inductance Lm and a series resistance Rm. The source $V_{EMF}$ represents the back electromagnetic force (back EMF) that would appear on the motor coil during steady-state operation if the series resistance Rm were zero. A coil voltage $V_{COIL}$ appears between circuit nodes labelled I VCM and B OUT. The voltage $V_{COIL}$ is generally different from the voltage $V_{EMF}$ due to the inductance Lm and the resistance Rm.

In the illustrated embodiment the motor 10 is a voice-coil motor used as an actuator for a read/write head in a disk drive. Also, the components within the dashed outline are part of a single integrated circuit whose input/output terminals are indicated by the darkened squares along the dashed outline. It will be clear to those skilled in the art, however, that the principles of the present invention may be used with other types of motors and other motor applications, and that different physical arrangements of the circuitry can also be employed.

Drive current is supplied to the motor 10 by an A amplifier 12 and a B amplifier 14 through respective terminals A OUT and B OUT. The A and B amplifiers are in turn controlled by a signal AIN representing the sum of various control and feedback signals VEL, DAC, IO VCM, and A OUT. The signal VEL is a velocity feedback signal, and is applied to the summation node AIN via a network consisting of resistors Rvel1 and Rvel2 and a capacitor Cvel1. The signal DAC is a speed control signal fed to the node AIN through a resistor R1. The signal IO VCM is a current sense signal supplied through a resistor R2. The signal A OUT is the output of the A amplifier, and is fed to the node AIN through a compensation resistor Rcomp and a compensation capacitor Ccomp.

Figure 1A:
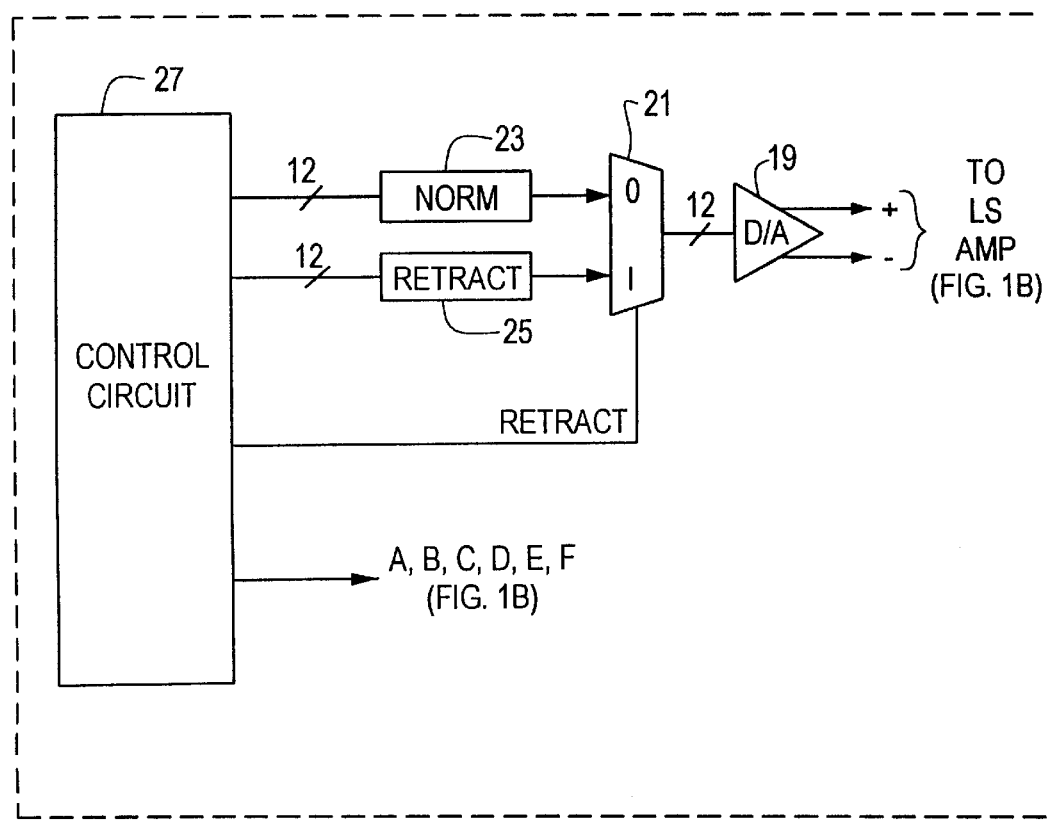
Figure 1B:
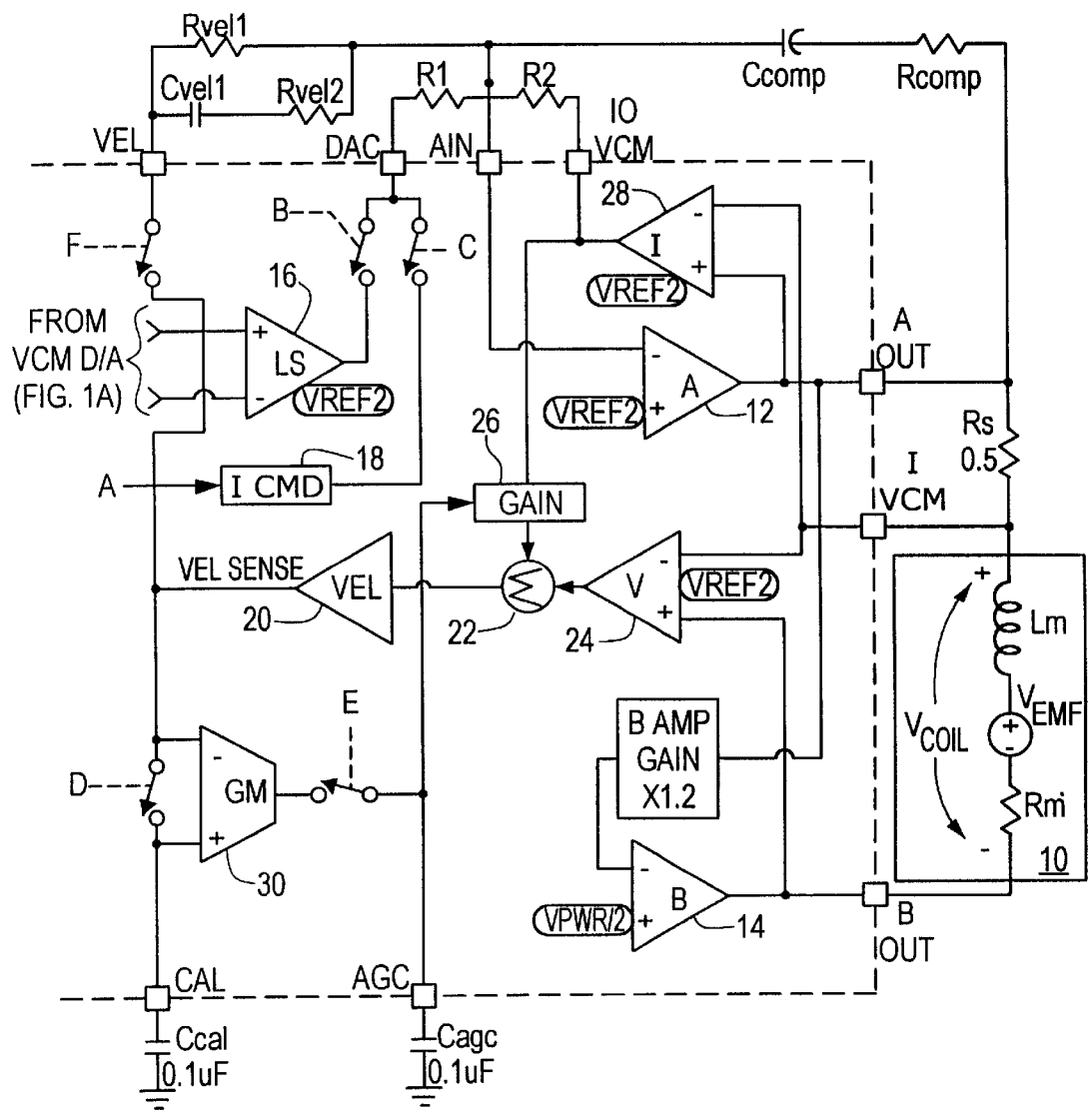

The signal DAC is provided by either a level-shifter (LS) amplifier 16 or a current-command (I CMD) circuit 18. The source of the DAC signal is selected by switches controlled by signals B and C. The inputs to the LS amplifier 16 are velocity command signals "+" and "−" from a voice-coil-motor (VCM) digital-to-analog converter (D/A) 19 (FIG. 1A). The I CMD circuit 18 is controlled by a signal A.

The D/A converter 19 is a 12-bit D/A converter that receives its digital input from a multiplexer 21. One input to the multiplexer 21 is from a NORM register 23 which holds a 12-bit digital value representing a desired speed for the VCM 10 under normal operating circumstances. The other input to the multiplexer 21 is from a RETRACT register 25 which holds a 12-bit digital value representing a desired speed for the VCM 10 when the read/write head is being retracted. The magnitude and polarity of the retract value are chosen such that the head is parked into the head stop at a desired speed when being retracted.

The circuit shown in FIG. 1 employs two voltage reference signals, VPWR/2 and VREF2. The signal VPWR/2 is equal to one-half of the supply voltage, and is used to maintain the common mode voltage of the VCM load at one-half of the supply voltage. With zero load current, the signals A OUT and B OUT are at one-half of the supply voltage. Loop summation errors at AIN cause the signals A OUT and B OUT to change with opposite polarities away from one-half of the supply voltage until the loop has closure. The signal VREF2 is a virtual ground for the analog components of the circuit, which is necessary to enable the components to operate on differential signals despite being powered by a single positive supply.

The signals A, B, and C, as well as additional control signals D, E and F, are generated by a control circuit 27, which may be a processor or sequential control logic. The control circuit 27 also generates a signal RETRACT that controls the multiplexer 21. The operation of the control circuit 27 is described in greater detail below in connection with the description of the calibration operation.

The signal VEL is provided by a switch controlled by a signal F. A signal VEL SENSE generated by a velocity (VEL) amplifier 20 appears on the other side of the F switch. The VEL amplifier 20 is driven by a summation circuit 22. The inputs to the summation circuit 22 are a voltage sense signal generated by a voltage sense (V) amplifier 24, and an amplified current sense signal generated by a gain circuit 26. The inputs to the V amplifier 24 are the motor coil signals I VCM and B OUT. The inputs to the gain circuit 26 are the current sense signal IO VCM and a gain-control signal AGC appearing on a capacitor Cagc. The signal IO VCM is generated by a current-sense (I) amplifier 28, whose inputs are the signals I VCM and A OUT. A 0.5-ohm sense resistor Rs is connected between nodes A OUT and I VCM.

A transconductance (GM) amplifier 30 has an inverting input connected to the output of the VEL amplifier 20, a positive input connected to a calibration capacitor Ccal, and an output connected to the gain-control capacitor Cagc via a switch controlled by a signal E. A switch controlled by a signal D is connected across the inputs of the GM amplifier 30.

The circuit shown in FIG. 1 has a normal operating mode and a calibration operating mode, these being established by the control circuit 27. During normal operation, switches B, D and F are closed, and switches C and E are open. The velocity feedback signal VEL represents the sum of the coil voltage $V_{COIL}$ and an error-cancelling quantity equal to the product of the current sense signal IO VCM and the gain-control signal AGC. The gain-control signal AGC remains substantially constant between consecutive calibrations. At the end of a calibration operation the gain-control signal AGC is set to a calibrated value effective to cause the gain circuit 26 and the summation network 22 to substantially remove the series resistance error from the coil voltage $V_{COIL}$.

The calibration operation takes advantage of the following principles. The EMF voltage $V_{EMF}$ is deemed to always be proportional to motor speed by a constant amount. Also, the EMF voltage $V_{EMF}$ at a steady speed is equal to the difference between the coil voltage $V_{COIL}$ and an error voltage caused by the series resistance Rm that is proportional to the current in the coil. Once the proportionality constant is known, the error voltage is removed from the coil voltage $V_{COIL}$ by subtracting the product of the coil current and the proportionality constant.

The calibration proceeds as follows. First, the signal VEL SENSE is sampled when the motor speed is a steady value and the coil current is zero. Under these conditions the voltage $V_{COIL}$ is equal to the voltage $V_{EMF}$, because the voltage across the resistor Rm is zero. This sampled value of VAL SENSE, referred to as the zero-current back EMF value, is saved on Ccal. Then the motor is made to rotate at the same speed but with a non-zero current. Under these conditions, the voltage $V_{COIL}$ contains a non-zero error component. The value of the signal AGC is adjusted until the gain circuit 26 causes the signal VAL SENSE to be equal to the value stored on Ccal. At this point, the signal VEL SENSE again reflects only the value of the voltage $V_{EMF}$, despite the error in the coil voltage $V_{COIL}$ induced by the series resistance Rm. Thus the gain circuit 26 and summation circuit 22 have been calibrated to remove the series resistance error. The calibrated value of the gain-control signal AGC is saved on Cagc, and used during subsequent normal operation of the controller.

The calibration operation described above can be used in one of two different modes. In one mode, the motor velocity is actually zero, and is constrained to remain at zero even when non-zero current is flowing in the coil. This mode is used at the beginning of a "Ramp Load" operation during which the read/write head actuated by the VCM motor 10 is to be moved onto a disk surface from a parked position on a ramp next to the disk. Before being moved, the head is stationary against a head stop on the ramp. The current pulse provided to the VCM 10 during the calibration operation urges the head against the stop, but does not change its velocity from zero.

The calibration operation is also used during a "Retract" operation in which the head is being retracted from the disk. In this case, the head velocity (and thus the motor speed) is non-zero. While the head is moving with no current flowing in the VCM coil, two successive current pulses of equal magnitude and duration, but opposite sign, are applied to the VCM 10. This causes the motor velocity to rise a small amount and then immediately fall back to its original velocity. At the very end of the current pulse, the motor velocity is the same as the zero-current velocity, but with a non-zero current flowing. This current is used to calibrate the gain-control signal AGC.

Figure 2:
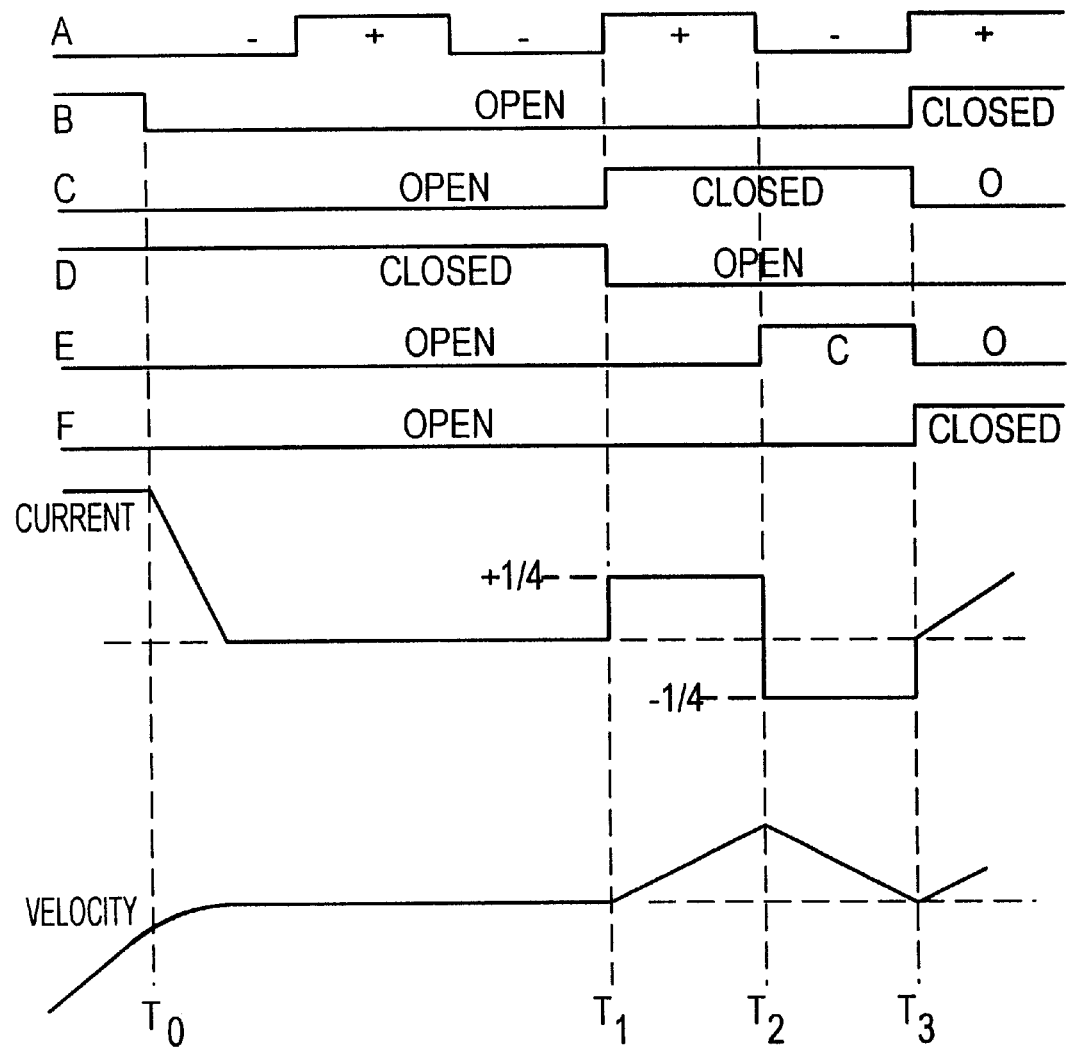
FIG. 2 is a timing diagram of various signals during calibration operation of the motor controller of FIG. 1.

The calibration operation in the Retract mode is now described in greater detail with reference to the circuit diagrams in FIG. 1 and the timing diagram of FIG. 2. In FIG. 2, the values of the waveforms for the control signals A–F are indicated the function of the corresponding device. Thus for corresponding values of signal A, positive (+) and negative (−) pulses are generated by the I CMD circuit 18. For corresponding values of the signals B through F, the corresponding switches are either open (OPEN or O) or closed (CLOSED or C).

Throughout the calibration operation, the switch controlled by signal F is open, so that the velocity sense signal VEL SENSE generated by the VEL amp 20 is disconnected from the summation node AIN. Thus during calibration the motor speed is controlled in an "open loop" manner such that the velocity sense signal VEL SENSE is prevented from affecting the drive to the motor 10.

Just prior to the beginning of the calibration operation at time $T_0$, the B and D switches are in the closed state, and the C, E, and F switches are in the open state. In this configuration the motor current is set by the VCM D/A through the LS amplifier 16 and the B switch, and the VEL SENSE signal is supplied to the capacitor Ccal through the E switch.

At time $T_0$, switch B is opened, disconnecting the LS amplifier 16 from the DAC node. This has the effect of forcing the motor coil current to quickly settle to zero. The next event occurs at time $T_1$, which is chosen to be sufficiently past time $T_0$ so that the motor current is substantially zero, and the motor velocity is substantially stable. At time $T_1$, the C switch is closed, connecting the I CMD circuit 18 to the node DAC. Also, the D switch is opened, causing the value of the signal VEL SENSE at time $T_1$ to be saved on the capacitor Ccal as a stored signal CAL. This is the zero-current back EMF value of VEL SENSE, as described above. The opening of the D switch also enables the GM amplifier 30 to subsequently detect the difference between the signal VEL SENSE and the stored signal CAL.

In the period between times $T_1$ and $T_2$, the signal A is "+", while between times $T_2$ and $T_3$ it is "−". These values of A cause the I CMD circuit 18 to generate a current pulse having two sub-pulses of corresponding positive and negative polarities as shown in FIG. 2. The magnitude of each subpulse is approximately one-fourth of full scale command current, and the duration of each sub-pulse is the same. This current pulse causes the motor velocity to rise and then fall as shown.

At time $T_2$, the switch E at the output of the GM amplifier 30 is closed. This causes the GM amplifier 30 to charge the capacitor Cagc. The capacitor Cagc is charged until the differential GM amplifier inputs VAL SENSE and CAL become equal. At this point the signal AGC is the desired calibrated value.

Because the current sub-pulses from the I CMD circuit 18 are of equal duration and equal but opposite polarity, the motor velocity at time $T_3$ returns to the value at time $T_1$. Time $T_3$ is therefore referred to as the "equal-speed time". At the equal-speed time $T_3$, the E switch is opened. This has the effect of saving the calibrated gain-control value on the capacitor Cagc.

Also at time $T_3$, the B and F switches are closed, and the C switch is opened. This allows the resumption of normal speed control operation using velocity feedback and the velocity commanded by the VCM D/A 19. The saved gain-control signal AGC controls the gain of the gain circuit 26 so that the signal VEL SENSE reflects the value of the voltage $V_{EMF}$ substantially error-free.

The foregoing has described the calibration operation during the Retract mode in which the motor speed is non-zero. The calibration operation during Ramp Load mode, in which the motor speed is constrained to be zero, is similar in most respects. In that case, however, it is not necessary to provide a bipolar current pulse to the coil to return the velocity to its beginning value. Thus a unipolar current pulse can be used, and the calibration measurement taken at the end of the current pulse as in the Retract case.

It will be apparent to those skilled in the art that modification to and variation of the above-described methods and apparatus are possible without departing from the inventive concepts disclosed herein. Accordingly, the invention should be viewed as limited solely by the scope and spirit of the appended claims.

What is claimed is:

1. A controller for a voice-coil motor, comprising:

drive circuitry operative in response to drive control signals, a velocity command signal, and a motor velocity sense signal to generate drive signals for the coil of the motor such that (1) the motor is operated at a normal operating velocity indicated by the velocity command signal when the drive control signals are in a first state, (2) the current in the coil is set to zero when the drive control signals are in a second state, and (3) a current pulse of predetermined magnitude and duration is provided to the coil when the drive control signals are in a third state;

sensing circuitry operative to continually generate the motor velocity sense signal such that the motor velocity sense signal is the sum of a first signal component and a second signal component, the first signal component representing the voltage across the coil, the second signal component representing the product of a gain value and the current in the coil, the gain value being determined by a gain-control signal stored within the controller;

calibration circuitry operative to calibrate the gain-control signal in response to calibration control signals such that (1) the value of the motor velocity sense signal is stored as a stored back EMF value when the calibration control signals are in a first state, and (2) the gain-control signal is set to a calibrated value which causes the motor velocity sense signal to be equal to the stored back EMF value when the calibration control signals are in a second state; and control circuitry operative to generate the drive control signals and the calibration control signals during a calibration operation such that:

(i) the current in the coil is set to zero from the beginning of the calibration operation to a time $T_1$ at which the coil current is substantially zero and the motor velocity is substantially constant;

(ii) a zero-current back EMF value of the motor velocity sense signal is stored at the time $T_1$;

(iii) the current pulse of predetermined magnitude and duration is provided to the coil after the zero-current back EMF value has been stored; and (iv) the gain-control signal is set to the calibrated value at a predetermined time during the pulsing of the coil current when the current in the coil is non-zero and the speed of the motor is substantially equal to the speed of the motor at the time $T_1$.

2. A motor controller according to claim 1, wherein the sensing circuitry comprises:

a voltage sense amplifier operative to generate a voltage sense signal indicative of the voltage across the motor coil;

a current sense amplifier operative to generate a current sense signal indicative of the current in the motor coil;

a gain circuit operative to continually amplify the current sense signal by the gain value determined by the gain-control signal; and a summation circuit operative to continually sum the amplified current sense signal and the voltage sense signal.

3. A motor controller according to claim 1, further comprising a first capacitor on which the gain-control signal is stored, and wherein the calibration circuitry comprises:

a second capacitor on which the back EMF value of the velocity sense signal is stored;

an amplifier having an output, an inverting input, and a non-inverting input, the inverting input being coupled to receive the velocity sense signal and the non-inverting input being coupled to the second capacitor;

a first switch connected between the velocity sense signal and the second capacitor and being controlled by a first one of the calibration signals; and a second switch connected between the output of the amplifier and the first capacitor and being controlled by a second one of the calibration signals.

4. A controller according to claim 1, wherein the drive circuitry comprises:

a first drive amplifier having an output, an inverting input, and a non-inverting input, the output to be coupled to a first terminal of the motor coil through a sense resistor, the non-inverting input being coupled to a first reference voltage, and the inverting input being coupled to a summation circuit node in the driver circuit;

a second drive amplifier having an output, an inverting input, and a non-inverting input, the output to be coupled to the second terminal of the coil, the non-inverting input being coupled to a second reference voltage, and the inverting input being coupled to the output of the first drive amplifier;

a velocity feedback circuit connected between the velocity sense signal and the summation node, the velocity feedback circuit including a switch connected between the velocity sense signal and the summation node and being controlled by a first one of the drive control signals;

a compensation circuit to be connected between the first coil terminal and the summation node;

a switch connected between the velocity command signal and the summation node and being controlled by a second one of the drive control signals;

a current command circuit operative to generate a current command signal having a positive polarity when a third one of the drive control signals is in one binary state and having a negative polarity when the third drive control signal is in the other binary state; and a switch connected between the current command signal and the summation node being controlled by a fourth one of the drive control signals.

5. A controller according to claim 1, wherein the current pulse of predetermined magnitude and duration provided to the coil by the drive circuitry is a bipolar current pulse having two sub-pulses of equal magnitude and duration but opposite polarity, the polarity being determined by one of the drive control signals, and wherein the calibration control circuitry is operative to perform the calibration operation when the motor velocity is non-zero.

6. A controller according to claim 1, wherein the current pulse of predetermined magnitude and duration provided to the coil by the drive circuitry is a unipolar current pulse, and wherein the calibration control circuitry is operative to perform the calibration operation when the motor velocity is constrained to be zero despite the pulsing of the coil current.

7. A controller according to claim 1, further comprising:

a register operative to be programmed with a digital value representing the normal operating velocity; and a digital-to-analog (D/A) converter coupled to the register and operative to generate the velocity command signal from the programmed digital value.

8. A controller for a voice-coil motor, comprising:

a first drive amplifier having an output, an inverting input, and a non-inverting input, the output to be coupled to a first terminal of the motor coil through a sense resistor, the non-inverting input being coupled to a first reference voltage, and the inverting input being coupled to a summation circuit node in the driver circuit;

a second drive amplifier having an output, an inverting input, and a non-inverting input, the output to be coupled to the second terminal of the coil, the non-inverting input being coupled to a second reference voltage, and the inverting input being coupled to the output of the first drive amplifier;

a velocity feedback circuit connected between a velocity sense signal and the summation node, the velocity feedback circuit including a switch connected between the velocity sense signal and the summation node and being controlled by a first drive control signal;

a compensation circuit to be connected between the first coil terminal and the summation node;

a switch connected between a velocity command signal and the summation node and being controlled by a second drive control signal;

a current command circuit operative to generate a current command signal having a positive polarity when a third drive control signal is in one binary state and having a negative polarity when the third drive control signal is in the other binary state;

a switch connected between the current command signal and the summation node being controlled by a fourth drive control signal;

a voltage sense amplifier to be coupled to the motor coil terminals to generate a voltage sense signal indicative of the voltage across the motor coil;

a current sense amplifier to be coupled to the sense resistor to generate a current sense signal indicative of the current in the motor coil;

a gain circuit operative to continually amplify the current sense signal by a gain value determined by a gain-control signal stored in the controller;

a summation circuit operative to generate the velocity sense signal by continually summing the amplified current sense signal and the voltage sense signal;

a first capacitor on which the gain-control signal is stored;

a second capacitor on which a back EMF value of the velocity sense signal is stored;

an amplifier having an output, an inverting input, and a non-inverting input, the inverting input being coupled to receive the velocity sense signal and the non-inverting input being coupled to the second capacitor;

a first switch connected between the velocity sense signal and the second capacitor and being controlled by a first calibration signal;

a second switch connected between the output of the amplifier and the first capacitor and being controlled by a second calibration signal; and control circuitry operative to generate the drive control signals and the calibration control signals during a calibration operation such that:
(i) the current in the coil is set to zero from the beginning the calibration operation to a time $T_1$ at which the coil current is substantially zero and the motor velocity is substantially constant;
(ii) a zero-current back EMF value of the motor velocity sense signal is stored at the time $T_1$;
(iii) the current command circuit causes a current pulse of predetermined magnitude and duration to be provided to the coil after the zero-current back EMF value has been stored; and
(iv) the gain-control signal is set to a calibrated value at a predetermined time during the pulsing of the coil current when the current in the coil is non-zero and the speed of the motor is substantially equal to the speed of the motor at the time $T_1$, the calibrated value being a value which causes the motor velocity sense signal to be equal to the stored zero-current back EMF value.

9. An integrated circuit capable of use in a voice-coil-motor (VCM) controller configuration, comprising:

a first drive amplifier having an output, an inverting input, and a non-inverting input, the output coupled to a first coil drive output terminal of integrated circuit, the non-inverting input being coupled to a first reference voltage, and the inverting input being coupled to a feedback summation input terminal of the integrated circuit;

a second drive amplifier having an output, an inverting input, and a non-inverting input, the output coupled to a second coil drive terminal of the integrated circuit, the non-inverting input being coupled to a second reference voltage, and the inverting input being coupled to the output of the first drive amplifier;

a switch having one terminal connected to a velocity feedback output terminal of the integrated circuit, the switch being controlled by a first control signal;

a velocity command circuit having an output indicating a desired operating velocity of the motor;

a switch connected between the output of the velocity command circuit and a velocity command output terminal of the integrated circuit, the switch being controlled by a second control signal;

a current command circuit operative to generate on an output thereof a current command signal having a positive polarity when a third control signal is in one binary state and having a negative polarity when the third control signal is in the other binary state;

a switch connected between the output of the current command circuit and the velocity command output terminal of the integrated circuit, the switch being controlled by a fourth control signal;

a voltage sense amplifier having an output, an inverting input, and a non-inverting input, the inverting input coupled to a coil current sense input terminal of the integrated circuit, and the non-inverting input being coupled to the second coil drive output terminal of the integrated circuit;

a current sense amplifier having an output, an inverting input, and a non-inverting input, the output coupled to a current feedback output terminal of the integrated circuit, the inverting input coupled to the coil current sense input terminal of the integrated circuit, and the non-inverting input coupled to the second coil drive output terminal of the integrated circuit;

a gain circuit having an output, a signal input, and a control input, the signal input being coupled to the output of the current sense amplifier, and the control input being coupled to a gain-control input terminal of the integrated circuit;

a summation circuit having an output and two inputs, one input coupled to the output of the gain circuit and the other input coupled to the output of the voltage sense amplifier;

a calibration amplifier having an output, an inverting input, and a non-inverting input, the inverting input being coupled to the output of the summation circuit and the non-inverting input being coupled to a calibration input terminal of the integrated circuit;

a switch connected between the output of the summation circuit and the calibration input terminal of the integrated circuit, the switch being controlled by a fifth control signal;

a switch connected between the output of the calibration amplifier and the gain-control input terminal of the integrated circuit, the switch being controlled by a sixth control signal; and control circuitry operative to generate the control signals during a calibration operation performed in the VCM controller configuration such that:
(i) the current in the coil is set to zero from the beginning the calibration operation to a time $T_1$ at which the coil current is substantially zero and the motor velocity is substantially constant;
(ii) a zero-current back EMF value of a motor velocity sense signal appearing on the output of the summation circuit is stored at the time $T_1$ on a capacitor connected to the calibration input terminal of the integrated circuit;
(iii) a current pulse of predetermined magnitude and duration is provided to the coil after the zero-current back EMF value has been stored; and
(iv) a gain-control signal stored on a capacitor connected to the gain-control input terminal of the integrated circuit is set to a calibrated value at a predetermined time during the pulsing of the coil current when the current in the coil is non-zero and the speed of the motor is substantially equal to the speed of the motor at the time $T_1$, the calibrated value being a value which causes the motor velocity sense signal to be equal to the zero-current back EMF value stored on the calibration capacitor.

* * * * *